United States Patent
Kaneko et al.

(10) Patent No.: US 7,427,849 B2
(45) Date of Patent: Sep. 23, 2008

(54) CONTROLLER FOR AN ELECTRIC VEHICLE AND DRIVING APPARATUS FOR THE ELECTRIC VEHICLE

(75) Inventors: Satoru Kaneko, Naka (JP); Tatsuyuki Yamamoto, Mito (JP); Kenta Katsuhama, Hitachinaka (JP); Shigeru Akaishi, Isesaki (JP); Hisao Iino, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 11/657,048

(22) Filed: Jan. 24, 2007

(65) Prior Publication Data

US 2007/0205741 A1    Sep. 6, 2007

(30) Foreign Application Priority Data

Mar. 6, 2006    (JP)    ............................. 2006-059472

(51) Int. Cl.
*H02P 27/04* (2006.01)
*G06G 7/70* (2006.01)

(52) U.S. Cl. .................. 318/801; 318/800; 318/140; 701/101; 701/22

(58) Field of Classification Search .................. 318/140, 318/800, 801, 802, 803
See application file for complete search history.

(56) References Cited

U.S. PATENT DOCUMENTS

| | | | |
|---|---|---|---|
| 5,550,445 A * | 8/1996 | Nii ............................. | 318/153 |
| 5,786,640 A * | 7/1998 | Sakai et al. .................. | 290/17 |
| 6,329,781 B1 | 12/2001 | Matsui et al. | |
| 6,889,126 B2 * | 5/2005 | Komiyama et al. ........... | 701/22 |
| 7,119,513 B2 * | 10/2006 | Ishikawa ..................... | 318/801 |
| 7,157,869 B2 * | 1/2007 | Ishikawa ..................... | 318/139 |
| 7,279,855 B2 * | 10/2007 | Tahara et al. .................. | 318/46 |
| 2005/0116680 A1 * | 6/2005 | Ishikawa et al. ............. | 318/801 |
| 2006/0202582 A1 * | 9/2006 | Umesaki et al. .............. | 310/162 |
| 2007/0296358 A1 * | 12/2007 | Sato et al. .................... | 318/139 |

FOREIGN PATENT DOCUMENTS

| | | |
|---|---|---|
| EP | 1 127 735 A2 | 8/2001 |
| EP | 1 580 058 A2 | 9/2005 |
| EP | 1 674 327 A2 | 6/2006 |
| EP | 1 702 788 A2 | 9/2006 |
| EP | 1 712 396 A1 | 10/2006 |
| JP | 3396440 B2 | 2/2003 |

OTHER PUBLICATIONS

European Search Report dated Jun. 1, 2007 (Nine (9) pages).

* cited by examiner

*Primary Examiner*—Lincoln Donovan
*Assistant Examiner*—Thai Dinh
(74) *Attorney, Agent, or Firm*—Crowell & Moring LLP

(57) ABSTRACT

The present invention provides a controller and driving apparatus for an electric vehicle, which enables a motor to steadily output torque even when there is an increase in the rotation speed of an internal combustion engine that drives a generator. A motor control unit includes a voltage/current command generator F10. The voltage/current command generator F10 includes a base command determination unit, which determines a base command value for the output voltage of the generator and base command values for d- and q-axis currents that drive an AC motor, and power generation operating point change means, which changes the command values that are output from the base command determination unit. When an operating point of the generator approaches an unstable region where the generator unsteadily operates, the power generation operating point change means changes the generator's operating point to position it within a stable region.

14 Claims, 9 Drawing Sheets

CONTROLLER FOR AN ELECTRIC VEHICLE AND DRIVING APPARATUS FOR THE ELECTRIC VEHICLE

BACKGROUND OF THE INVENTION

1. Field of the Invention

The present invention relates to a controller for an electric vehicle and a driving apparatus for the electric vehicle, and more particularly to a controller and driving apparatus for an electric vehicle in which an internal combustion engine's rotational power drives a generator and the power generated by the generator drives a motor.

2. Description of the Related Art

In recent years, an increasing number of electric vehicles are running by using a motor as a driving source. They are electric automobiles, hybrid automobiles, and other environment-responsive automobiles. These environment-responsive automobiles are mainly characterized by the fact that they carry a battery, use the power stored in the battery to let the motor generate torque, and drive tires for running purposes. Recently, a permanent-magnet synchronous motor or other AC motor is employed as the motor for downsizing purposes (for achieving a high power ensity). Further, an inverter (power converter) is used to supply the DC power of the battery to the AC motor. The inverter receives the DC power from the battery and converts it to AC power. The inverter can be controlled to exercise variable speed control over the AC motor.

In the above-mentioned environment-responsive automobiles, the power supply to the inverter is always stable because they carry a battery as a power source for the motor. In such an instance, the voltage received by the inverter varies with the prevailing charge/discharge state of the battery, but is a DC voltage whose variation is generally small. A known control technology for a motor-driven system that uses a battery as a power source as described above is disclosed, for instance, by JP-B-3396440. The disclosed technology provides a plurality of motor current command tables, which include maximum and minimum values of battery voltage, and outputs an optimum motor current command in accordance with the prevailing battery voltage. This makes it possible to always generate a stable torque output in all motor rotation regions.

Recently, electric four-wheel-drive vehicles whose front wheels and rear wheels are driven respectively by an engine and by a motor have begun to be widespread in addition to hybrid vehicles. The system mounted in such four-wheel-drive vehicles incorporates no battery and drives a rear-wheel motor by using only the power generated from a generator connected to the engine with a view toward reducing the cost to a level lower than that of a mechanical four-wheel-drive vehicle and offering improved component assembly capability. In other words, the system mounted in a batteryless, electric four-wheel-drive vehicle directly drives the AC motor by using the power output from the generator. Moreover, the electric four-wheel-drive system employs an "alternator," whose converter is a diode rectifier, as the generator in order to further reduce the cost. The electric four-wheel-drive vehicle may be such that its rear wheels are engine-driven while its front wheels are motor-driven. The electric vehicle described above is not limited to a four-wheeled vehicle and may be a vehicle having six or more wheels.

SUMMARY OF THE INVENTION

The technology disclosed by JP-B-3396440 uses table data to change the motor current command in accordance with the battery voltage. Therefore, it makes it possible to exercise optimum, weak field control over each battery voltage and obtain stable torque from the motor.

In the above-mentioned electric vehicle without a battery, the power generated by the alternator, which is connected to the engine, is used so that the inverter and motor, which are mounted to drive the rear wheels, generate torque to drive the vehicle. Since the electric vehicle without a battery uses the alternator as a power generation source as described above, the power generation state varies with the engine speed. In other words, the output voltage greatly varies with the engine speed even when the magnetic field state remains unchanged.

When, on the other hand, specified torque is to be generated in a situation where an AC motor is used as the motor, the AC motor is subjected to power control in accordance with an equal power curve required for the motor/inverter. Further, the power generation characteristic of the alternator indicates that there are a stable region where power control can be consistently exercised and an unstable region where power control is unstable. A boundary line between the stable region and unstable region varies with the engine speed. Therefore, even when power control is consistently exercised while the operating point of the motor/inverter is positioned above the boundary line at a certain engine speed, a voltage decrease occurs at a power generation operating point of the alternator if the engine speed increases to position the operating point of the motor/inverter below the boundary line. This eventually leads to a situation where the voltage is extremely low. As a result, the motor does not generate required torque. Therefore, when the electric four-wheel-drive system is operated as described by JP-B-3396440, the motor operating point cannot be changed in accordance with the engine speed. Consequently, the above-mentioned voltage drop occurs, making it practically impossible to obtain required torque.

Even when the electric vehicle incorporates a battery, the above problem can occur if the output energy of the generator needs to be equal to the input energy of the inverter depending on the battery condition.

It is an object of the present invention to provide a controller and driving apparatus for an electric vehicle, which enables a motor to steadily output torque even when there is an increase in the rotation speed of an internal combustion engine that drives a generator.

To achieve the above object, the present invention provides a controller for an electric vehicle in which first wheels and second wheels are driven respectively by an internal combustion engine and by an AC motor, and DC power output from a generator that is driven by the internal combustion engine is converted to AC power by an inverter and supplied to the AC motor to drive the AC motor. The controller includes control means that not only controls a field current of the generator to control power that is output from the generator, but also controls torque that is output from the AC motor. When an operating point of the generator approaches an unstable region where the generator unsteadily operates, the control means changes the generator's operating point to position it within a stable region.

To achieve the above object, the present invention also provides a controller for an electric vehicle in which first wheels and second wheels are driven respectively by an internal combustion engine and by an AC motor, and DC power output from a generator that is driven by the internal combustion engine is converted to AC power by an inverter and supplied to the AC motor to drive the AC motor. The controller includes control means that not only controls a field current of the generator to control power that is output from the generator, but also controls torque that is output from the AC motor. When the rotation speed of the internal combustion engine increases while the output power of the AC motor remains unchanged, the control means changes the operating point of the generator so that the output voltage of the generator increases.

The above features make it possible to steadily output torque even when the engine speed increases in an electric vehicle that incorporates no battery and drives an AC motor by using only the power generated by a generator.

Even when there is an increase in the rotation speed of an internal combustion engine that drives a generator, the present invention enables a motor to steadily output torque.

BRIEF DESCRIPTION THE DRAWINGS

DETAILED DESCRIPTION OF THE PREFERRED EMBODIMENTS

The configuration and operation of a controller for an electric vehicle according to a first embodiment of the present invention will now be described with reference to FIGS. 1 to 13. For explanation purposes, the description of the first embodiment of the present invention relates to an electric four-wheel-drive vehicle whose rear wheels are driven by an AC motor.

First of all, the system configuration of an electric four-wheel-drive vehicle to which the controller according to the present embodiment is applied will be described.

Figure 1:
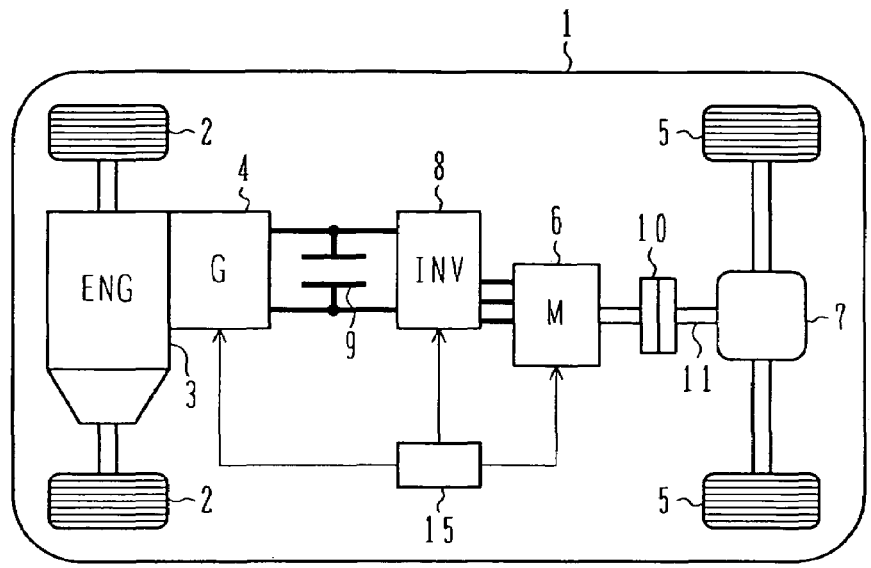
FIG. 1 is a system configuration diagram illustrating an electric four-wheel-drive vehicle to which a controller according to a first embodiment of the present invention is applied.

FIG. 1 is a system configuration diagram illustrating the electric four-wheel-drive vehicle to which the controller according to the first embodiment of the present invention is applied.

In the electric four-wheel-drive vehicle 1, a dedicated generator 4 is connected to an engine 3 that drives front wheels 2. An AC motor 6 generates motive energy on the basis of power generated by the generator 4. The generator 4 is an alternator whose converter for converting generated AC power to DC power is a diode bridge based rectifier. The motive energy generated by the AC motor 6 drives rear wheels 5. This motive energy is distributed to the right and left by a differential gear unit 7 and transmitted to the rear wheels 5. To let the motor, which drives the rear wheels, generate specified torque in an electric four-wheel-drive vehicle system, which does not incorporate a battery as described above, the generator 4 (alternator) needs to accurately generate power (electrical power) required by the motor and inverter and supply the generated power.

A 4WD clutch 10, which opens and closes a motive energy transmission path, is provided between the AC motor 6 and differential gear unit 7. Further, an inverter 8 is furnished to adjust the torque of the AC motor 6 for a required value. The inverter 8 converts DC power, which is output from the generator 4, to AC power, and supplies the AC power to the AC motor 6. The input section of the inverter 8 handles power that is considerably pulsated by a switching operation of a power device. A capacitor 9 is therefore used to smooth such pulsating power.

The inverter 8, AC motor 6, and generator 4 are controlled by a controller 15.

The electric four-wheel-drive vehicle based on the AC motor is configured as described above. A low-cost system is employed for the electric four-wheel-drive vehicle. The employed system does not incorporate a battery and drives the motor by using only the power generated by the generator 4. The electric four-wheel-drive vehicle may be such that its rear wheels are engine-driven while its front wheels are motor-driven. Further, the electric vehicle according to the present embodiment is not limited to a four-wheeled vehicle and may be a vehicle having six or more wheels.

An electrical power flow in the electric four-wheel-drive vehicle to which the controller according to the present embodiment is applied will now be described with reference to FIG. 2.

Figure 2:
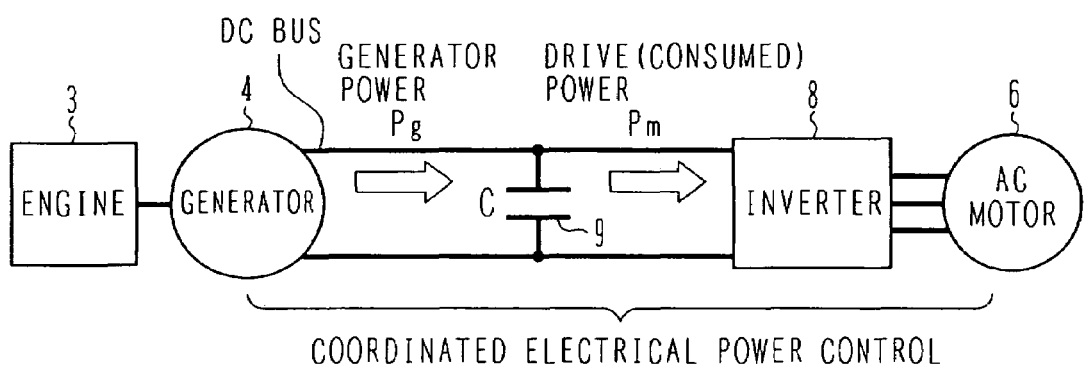
FIG. 2 is an electrical power flow diagram of the electric four-wheel-drive vehicle to which the controller according to the first embodiment of the present invention is applied.

FIG. 2 is an electrical power flow diagram of the electric four-wheel-drive vehicle to which the controller according to the first embodiment of the present invention is applied. Elements shown in FIGS. 1 and 2 are designated by the same reference numerals when they are identical with each other.

FIG. 2 illustrates an electrical power flow between the generator 4 and AC motor 6 in the electric four-wheel-drive vehicle. In a common hybrid vehicle, a battery is connected in parallel with the capacitor 9 as an electrical power generation source and recovery source. As regards the electric four-wheel-drive vehicle, however, it is demanded that its cost be lower than that of a conventional mechanical four-wheel-drive vehicle. In most cases, therefore, the electric four-wheel-drive vehicle does not incorporate a battery.

As described above, the electric four-wheel-drive system based on the AC motor does not have a battery that absorbs electrical power. It is therefore necessary to exercise coordinated electrical power control so that power generation energy Pg, which is output from the engine-driven generator 4, is equal to drive energy Pm, which is input to the inverter 8 and AC motor 6.

However, when the balance between the power generation energy Pg and drive energy Pm is impaired, that is, when, for instance, the power generation energy Pg is greater than the drive energy Pm, excessive electrical power flows into the smoothing capacitor 9, thereby raising the voltage of the DC bus. If the DC bus voltage exceeds a maximum allowable value, a power device for the capacitor 9 or inverter 8 may be destroyed. On the other hand, when the power generation energy Pg is smaller than the drive energy Pm, the electrical power stored in the capacitor 9 is consumed by the inverter 8 and AC motor 6. This lowers the voltage, making it practically impossible to output required torque.

The motor 6 can provide highly responsive, highly accurate torque control by exercising electrical current control for a rotating coordinate system (d-q coordinates), that is, vector current control. Meanwhile, power generation control over the generator 4 is exercised by manipulating a field current, which is slow in response. Therefore, power generation control over the generator 4 needs to be exercised accurately in accordance with the behaviors of the inverter 8 and motor 6.

Coordinated electrical power control between the generator 4 and motor 6/inverter 8, which is exercised by the controller according to the present embodiment, will now be described with reference to FIGS. 3 and 4.

Figure 3:
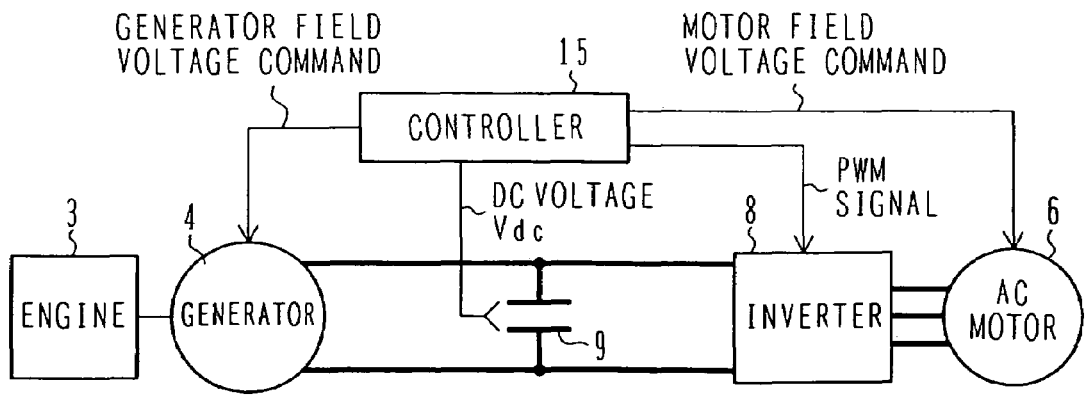
FIG. 3 is a hardware configuration diagram illustrating coordinated electrical power control between a generator and motor/inverter, which is exercised by the controller according to the first embodiment of the present invention.
Figure 4:
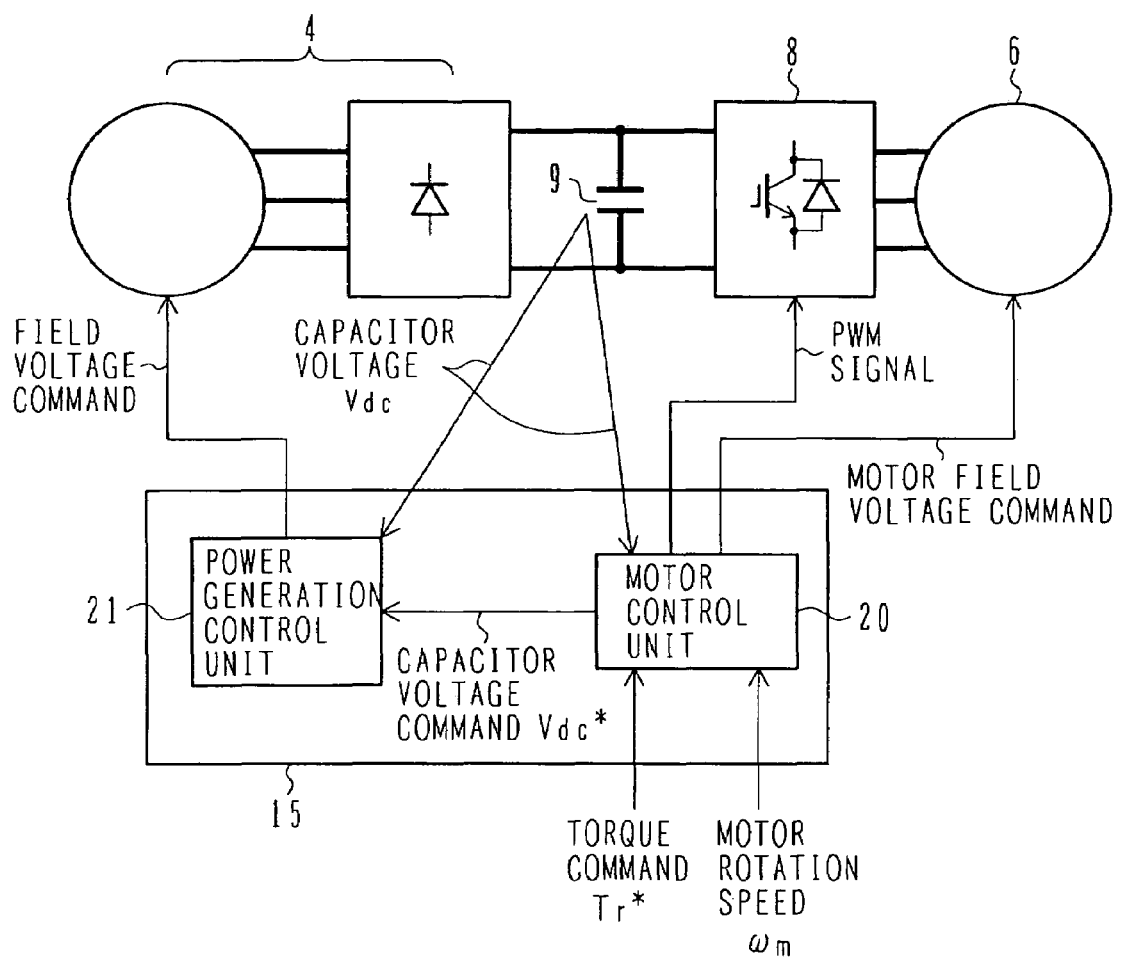
FIG. 4 is a control block diagram illustrating coordinated electrical power control between the generator and motor/inverter, which is exercised by the controller according to the first embodiment of the present invention.

FIG. 3 is a hardware configuration diagram illustrating coordinated electrical power control between the generator and motor/inverter, which is exercised by the controller according to the first embodiment of the present invention. FIG. 4 is a control block diagram illustrating coordinated electrical power control between the generator and motor/inverter, which is exercised by the controller according to the first embodiment of the present invention. Elements shown in FIGS. 1 and 2 and FIGS. 3 and 4 are designated by the same reference numerals when they are identical with each other.

A "DC voltage feedback control method," which feeds back the DC bus voltage (smoothing capacitor voltage), will be described below. A capacitor voltage command Vdc*, which is shown in FIG. 4, corresponds to a command value for the DC bus voltage. In coordinated control, the capacitor voltage Vdc is feedback-controlled in relation to the voltage command Vdc*. When the capacitor voltage Vdc can be consistently controlled in relation to the voltage command Vdc* as described above, coordinated electrical power control can be exercised between the generator and motor/inverter.

The capacitor voltage command Vdc* is determined in accordance with the generator's operating state and the motor's operating point (motor rotation speed and motor torque). A motor control unit 20 in the controller 15 exercises motor control in accordance with the voltage Vdc of the DC bus as described above, and outputs a PWM command to the inverter 8 and a field voltage command to the motor 6. Meanwhile, a power generation control unit 21 in the controller 15 exercises power generation control over the generator (dedicated alternator) so that the capacitor voltage Vdc agrees with the command value Vdc*. The power generated by the generator 4 is determined by the rotation speed and magnetic field. Since the rotation speed is determined by the engine speed, the power generation control unit 21 controls the field voltage. While the capacitor voltage Vdc is in agreement with the command value Vdc* (or it is considered that the capacitor voltage Vdc is in agreement with the command value Vdc*), motor control and power generation control are properly balanced with each other so that a coordinated state prevails. Therefore, the AC motor 6 for rear wheel drive outputs torque in accordance with the command value. In this instance, the inverter 8 can exercise accurate power control over the AC motor 6 on the drive side. In other words, the inverter 8 supplies a current, at a certain motor rotation speed, to the AC motor 6 to generate torque in accordance with a specified torque command value.

The configuration of the controller according to the present embodiment will now be described with reference to FIG. 5.

Figure 5:
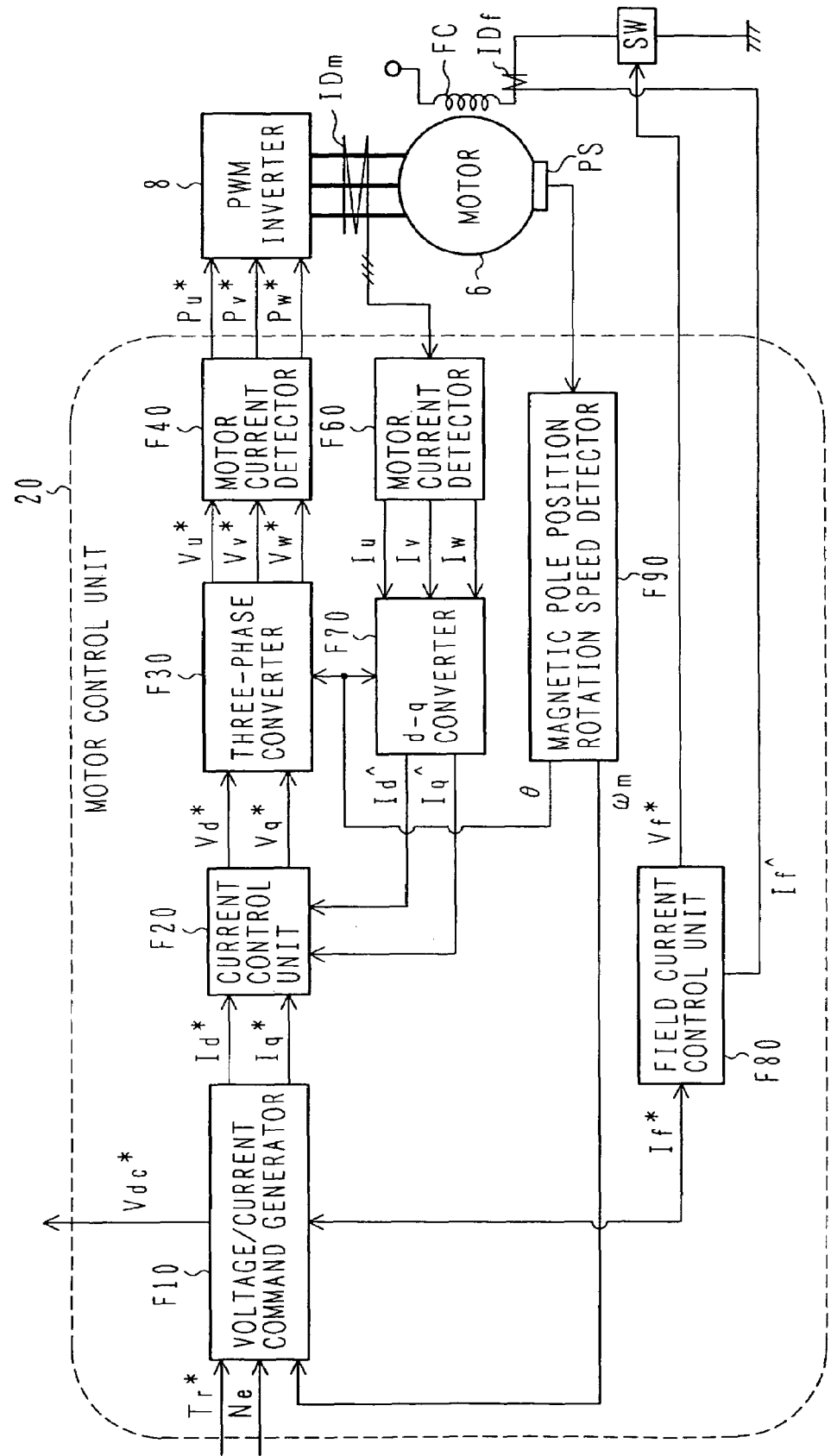
FIG. 5 is a block diagram illustrating the configuration of a motor control unit that is used in the controller according to the first embodiment of the present invention.

FIG. 5 is a block diagram illustrating the configuration of the motor control unit that is used in the controller according to the first embodiment of the present invention. Elements shown in FIGS. 1, 2, and 5 are designated by the same reference numerals when they are identical with each other.

As indicated in FIG. 5, the motor control unit 20 inputs a torque command Tr*, which is calculated in accordance with system control that is provided by the upper-level controller, and an engine speed Ne, and outputs a PWM signal to the PWM inverter 8 so that the AC motor 6 generates the specified toque. Further, the motor control unit 20 calculates a capacitor voltage command value Vdc* and outputs it. The engine speed Ne is used for command value correction. This matter will be described later with reference to FIG. 8.

The motor control unit 20 includes a voltage/current command generator F10, a motor current control unit F20, a three-phase converter F30, a PWM converter F40, a capacitor voltage command calculation unit F50, a motor current detector F60, a d-q converter F70, a field current control unit F80, and a magnetic pole position rotation speed detector F90.

The voltage/current command generator F10 inputs the torque command Tr* and motor angular speed ωm, determines motor current commands Iq*, Id*, field current command If*, and capacitor voltage command value Vdc* that provide the highest efficiency at the current operating point, and outputs them. Motor current command Id* is a command for the current in the flux direction of the motor rotor (d-axis), whereas motor current command Iq* is a command for the current in the direction orthogonal to the flux direction of the motor rotor (q-axis).

The motor current control unit F20 performs current control calculations on the rotation coordinate d-q axis to determine voltage commands Vd*, Vq* for the d-q axis. When electrical current control is exercised for the d-q coordinates in this manner, it is possible to accurately control the current in the flux direction and the current in a direction orthogonal to the flux direction (the current that affects the torque). This makes it possible to accurately control the motor torque and flux.

The three-phase converter F30 effects coordinate conversion from the d-q axis to the U-V-W phase, and outputs three-phase AC voltage commands Vu*, Vv*, Vw*. The PWM converter F40 converts the AC voltage commands Vu*, Vv*, Vw* to PWM signals, and outputs the PWM signals to the inverter 8 via a driver.

Feedback values $Id\hat{}$, $Iq\hat{}$, which are used for electrical current control in the motor current control unit F20, are detected as described below. First, motor currents Iu, Iv, Iw detected by a three-phase motor current sensor IDm are acquired by the motor current detector F60, which includes an analog-to-digital converter. The d-q converter F70 then calculates detected currents $Id\hat{}$, $Iq\hat{}$ for the d-q axis, and feeds them back to the motor current control unit F20.

In this control system, the magnetic pole position θ is required for coordinate conversion calculations that are performed to obtain a U-V-W phase voltage command from a d-q coordinate voltage command and a d-q coordinate current from a U-V-W phase current, as described above. Therefore, a position sensor PS is provided for the motor 6. This position sensor PS and the magnetic pole position rotation speed detector F90 in the motor control unit 20 detect a rotor magnetic pole position detection value θc of the AC motor 6. The motor angular speed ωm, which is required for the voltage/current command generator F10 and motor current control unit F20, is determined in the magnetic pole position rotation unit F20 as a time-variable amount of rotor magnetic pole position detection value θc. (The field current control unit F80 may use a method of measuring rotation pulses from the position sensor PS with a controller counter and calculating the motor speed from the measured value.)

The field current control unit F80 outputs a field voltage command Vf in accordance with the field current command If*, which is output from the current command determination unit F10, and a field current If^, which is detected by a field current detector IDf and flows to a field winding FC of the motor 6, converts the field voltage command Vf to a duty signal, and turns on/off a switching element SW to control the field current.

When required electrical power is supplied from the generator (alternator) in the electric four-wheel-drive system without a battery, the motor/inverter on the driving side can generate torque in compliance with a command value as described above. In this instance, the generator (alternator) generates electrical power by using the rotational power of the engine. Since the rotation of the engine incessantly varies with the driver's acceleration and the prevailing driving conditions, the power generation state of the generator (alternator) also varies at all times. Under such circumstances, it is extremely important for the system that the generator (alternator) accurately generate the electrical power required for the motor/inverter. As such being the case, the power generation characteristic of the generator (alternator) will be described below.

The power generation characteristic of the generator for use in an electric vehicle according to the present embodiment will now be described with reference to FIGS. 6 and 7.

Figure 6:
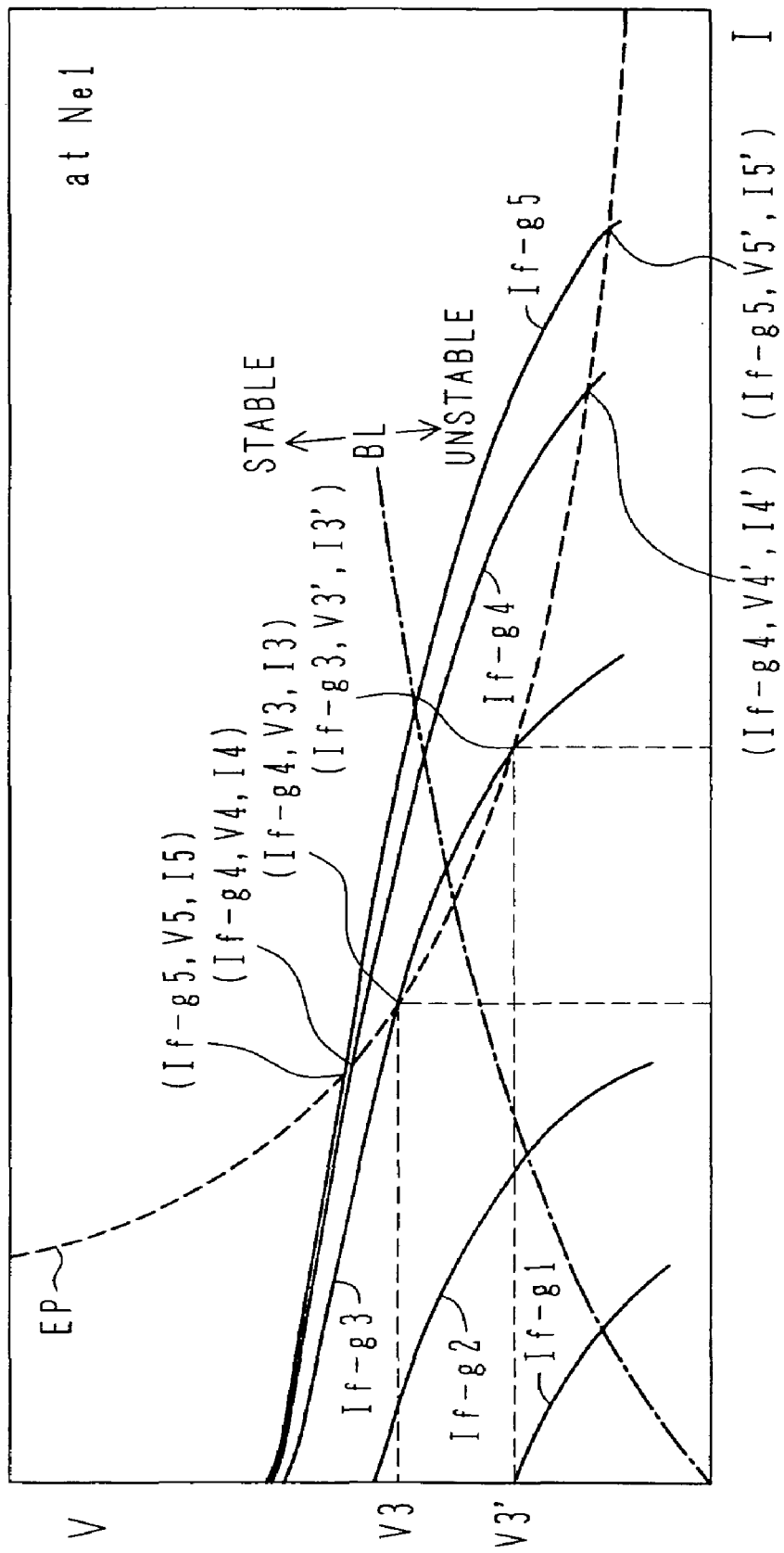
FIG. 6 illustrates the power generation characteristic of the generator for use in an electric vehicle according to the first embodiment of the present invention.
Figure 7:
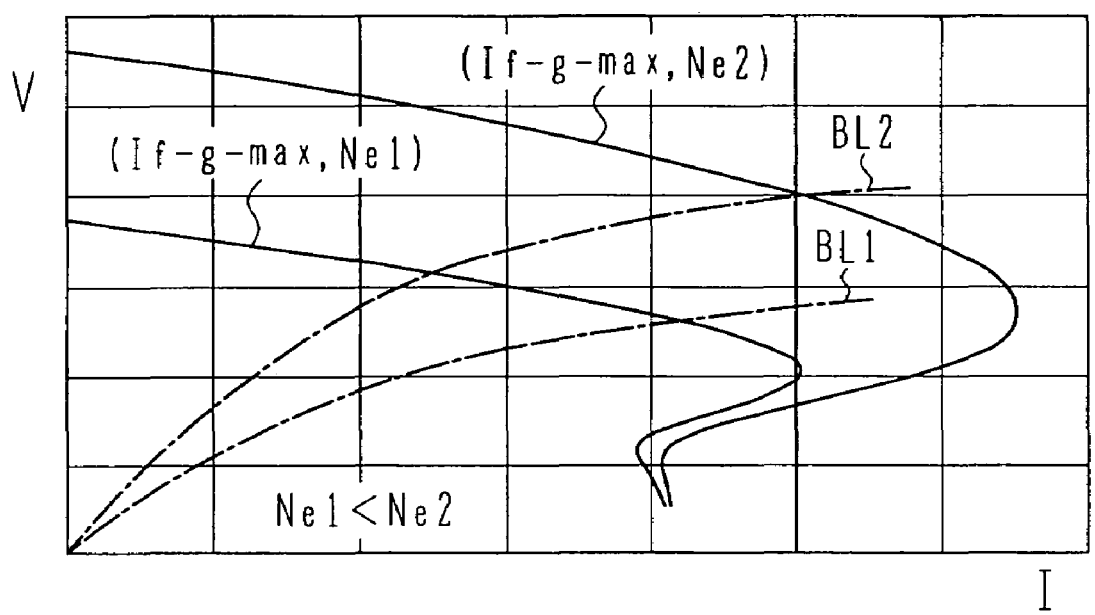
FIG. 7 illustrates the power generation characteristic of the generator for use in the electric vehicle according to the first embodiment of the present invention.

FIGS. 6 and 7 illustrate the power generation characteristic of the generator for use in an electric vehicle according to the first embodiment of the present invention.

In FIG. 6, the vertical axis indicates the output voltage V of the generator (alternator), and the horizontal axis indicates the output current I of the generator (alternator). Solid lines indicate an output voltage V-output current I characteristic of the generator (alternator) that prevails when the rotation speed Ne of the engine 3 is a predetermined rotation speed Ne1 and the field current If-g of the generator (alternator) is field current If-g1, If-g2, If-g3, If-g4, or If-g5. It is assumed that field currents If-g1, If-g2, If-g3, If-g4, and If-g5 are in a relationship expressed by If-g1<If-g2<If-g3<If-g4<If-g5. In other words, the power generation characteristic of the alternator is such that the output power of the generator (alternator) increases with an increase in the field current If-g.

A speed increasing mechanism having a predetermined speed increasing ratio is coupled between the engine 3 and generator (alternator) 4. Therefore, if, for instance, the rotation speed of the engine 3 is 600 rpm in a situation where the speed increasing ratio is 2.5, the rotation speed of the generator (alternator) 4 is 1500 rpm.

A broken line EP in FIG. 6 represents an equal power curve, which indicates equal power (e.g., 3 kW) that is demanded by the rear-wheel-drive AC motor 6/inverter 8. The rear-wheel-drive AC motor 6/inverter 8 exhibits the equal power curve EP, which is indicated by the broke line, because it attempts to generate specified torque at a specific motor rotation speed.

Here it is assumed that the voltages/currents of intersections between the equal power curve EP, which is indicated by a broken line, and the generator (alternator) output voltage V-output current I characteristics of field currents If-g3, If-g4, and If-g5 are intersections (If-g3,V3,I3), (If-g4,V4,I4), (If-g1,V5,I5), (If-g3,V3',I3'), (If-g4,V4',I4'), and (If-g1,V5',I5'). As shown in the figure, the voltage indicated by the equal power curve decreases with a decrease in the field current on the high-voltage side of the alternator's power generation region, whereas the voltage indicated by the equal power curve decreases with an increase in the field current on the low-voltage side of the alternator's power generation region. More specifically, the voltage values of intersections (If-g3, V3,I3), (If-g4,V4,I4), and (If-g1,V5,I5) increase to voltages V3, V4, and V5 with an increase in the field current If-g, whereas the voltage values of intersections (If-g3,V3',I3'), (If-g4,V4',I4'), and (If-g1,V5',I5') decrease to voltages V3', V4', and V5' with an increase in the field current If-g, as indicated by the equal power curve EP. In other words, when the load on the alternator (i.e., AC motor 6) moves along the equal power curve, the direction of field current increase/decrease on the high-voltage side differs from that on the low-voltage side. Therefore, if, on the low-voltage side, the voltage decreases for some reason and the alternator's field current is increased to compensate for such a voltage decrease when the motor/inverter exercises power control, the voltage continues to decrease. It means that the motor/inverter cannot exercise consistent power control in the low-voltage region of the alternator.

The figure also shows a voltage curve EL, which is indicated by a one-dot chain line. The voltage curve EL represents a boundary line that indicates a power control stability limit. The high-voltage side of the boundary line EL is a stable region where the motor/inverter can provide consistent power control. On the other hand, the low-voltage side of the boundary line EL is an unstable region where the motor/inverter provides inconsistent power control.

FIG. 7 will now be referenced to describe how the above-mentioned boundary line EL, which indicates the power control stability limit, is dependent on the engine speed.

As is the case with FIG. 6, the vertical and horizontal axes of FIG. 7 indicate the output voltage V and output current I of the generator (alternator), respectively.

Solid lines (If-g-max,Ne1) and (If-g-max,Ne2) respectively represent characteristics in which the output power of the generator (alternator) increases. The field currents If-g are maximum values If-g-max and represent the alternator's power generation characteristic that prevails when the alternator's output is maximized. Solid line (If-g-max,Ne1) represents the power generation characteristic of the alternator's maximum output that prevails when the engine speed is Ne1. Solid line (If-g-max,Ne2) represents the power generation characteristic of the alternator's maximum output that prevails when the engine speed is Ne2. Engine speed Ne1 is lower than engine speed Ne2. More specifically, when the engine speed increases, the alternator's rotation speed increases to increase the alternator's maximum output.

Boundary lines BL1 and BL2, which are indicated by one-dot chain lines, represent boundary lines between the unstable region and stable region that prevail when the engine speed is Ne1 or Ne2. Boundary line BL1 is a boundary line for engine speed Ne1, whereas boundary line BL2 is a boundary line for engine speed Ne2. More specifically, when the engine speed increases, the range of power generated by the alternator increases, thereby moving the boundary line toward the high-voltage side. Even when power control is consistently exercised while the operating point of the motor/inverter is positioned above the boundary line at a certain engine speed, a voltage decrease occurs at a power generation operating point of the alternator if the engine speed increases to position the operating point of the motor/inverter below the boundary line. This eventually leads to a situation where the voltage is extremely low. As a result, the motor does not generate required torque.

The configuration and operation of the voltage/current command generator F10, which is included in the controller according to the present embodiment, will now be described with reference to FIGS. 8 to 13.

Figure 8:
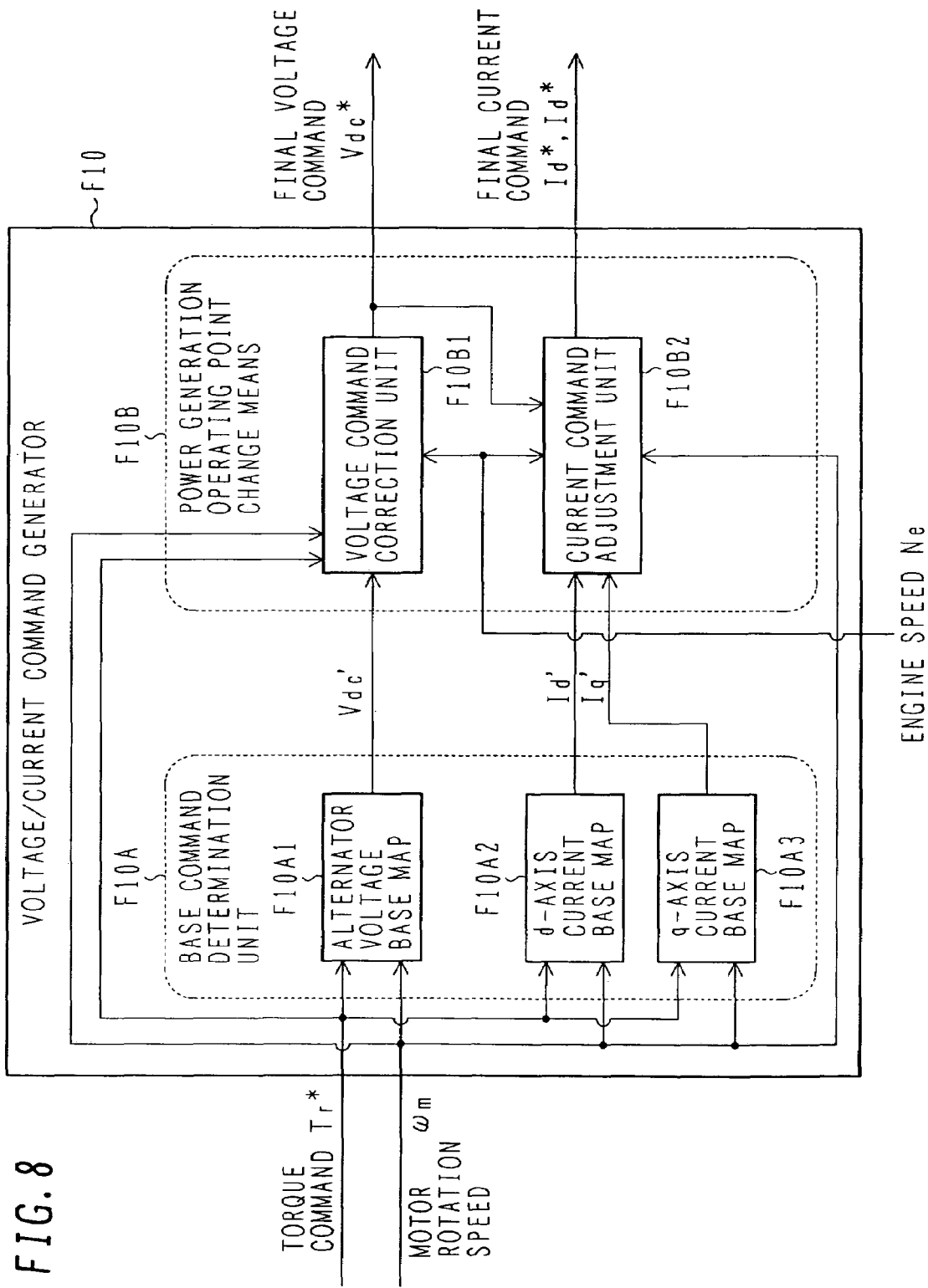
FIG. 8 is a block diagram illustrating the configuration of a voltage/current command generator that is included in the controller according to the first embodiment of the present invention.

FIG. 8 is a block diagram illustrating the configuration of the voltage/current command generator, which is included in the controller according to the first embodiment of the present invention. FIGS. 9 to 13 illustrate the operation of the voltage/current command generator, which is included in the controller according to the first embodiment of the present invention. Elements shown in FIGS. 5 and 8 are designated by the same reference numerals when they are identical with each other.

As shown in FIG. 8, the voltage/current command generator F10 includes a base command determination unit F10A and power generation operating point change means F10B. The base command determination unit F10A includes an alternator voltage base map F10A1, a d-axis current base map F10A2, and a q-axis current base map F10A3. The power generation operating point change means F10B includes a voltage command correction unit F10B1 and a current command adjustment unit F10B2.

An object of the present invention is to generate torque steadily and constantly even when the engine speed increases in the electric four-wheel-drive system that incorporates no battery and drives the AC motor by using only the power generated from the generator. Thus, the present invention includes the power generation operating point change means F10B.

The base command determination unit F10A inputs the torque command Tr* from the upper-level controller and the motor rotation speed ωm detected by a position detector 27, determines the alternator's voltage base command value Vdc', d-axis current base command value Id', and q-axis current base command value Iq', and outputs the determined base command values. In consideration of computational load on an arithmetic device, the base command determination unit F10A determines the base command values by using three data tables (maps), which are the alternator voltage base map F10A1, d-axis current base map F10A2, and q-axis current base map F10A3. However, the present invention is not limited to the use of such maps. In a battery-incorporated hybrid system, for example, the base command values may be directly input as the command values for a current control system that is formulated within the motor control unit 20.

The power generation operating point change means F10B inputs the alternator's voltage base command value Vdc', d-axis current base command value Id', and q-axis current base command value Iq', which are output from the base command determination unit F10A, and the engine speed Ne, and outputs the alternator's voltage command value Vdc*, d-axis current command value Id*, and q-axis current command value Iq* that are changed in accordance with the present operating point of the engine. The alternator's voltage command value Vdc* is output to the power generation control unit 21 and used as a power generation control command value for the alternator 4. The d-axis current command value Id* and q-axis current command value Iq* are used as command values for motor current control that is exercised within the motor control unit 20.

The voltage command correction unit F10B1 inputs the alternator's voltage base command value Vdc' and engine speed Ne, and corrects the power generation operating point in such a manner as to avoid the unstable region for alternator power control. In other words, the voltage command correction unit F10B1 moves the command value for the output voltage Vdc of the alternator to a region where consistent power control is provided at the present operating point of the engine. The voltage command correction unit F10B1 has data about the alternator's maximum power generation range at each engine speed (which varies, for instance, in increments of 1000 rpm) and the power control boundary line, and calculates an alternator voltage command for the present engine speed in accordance with such data.

Figure 9:
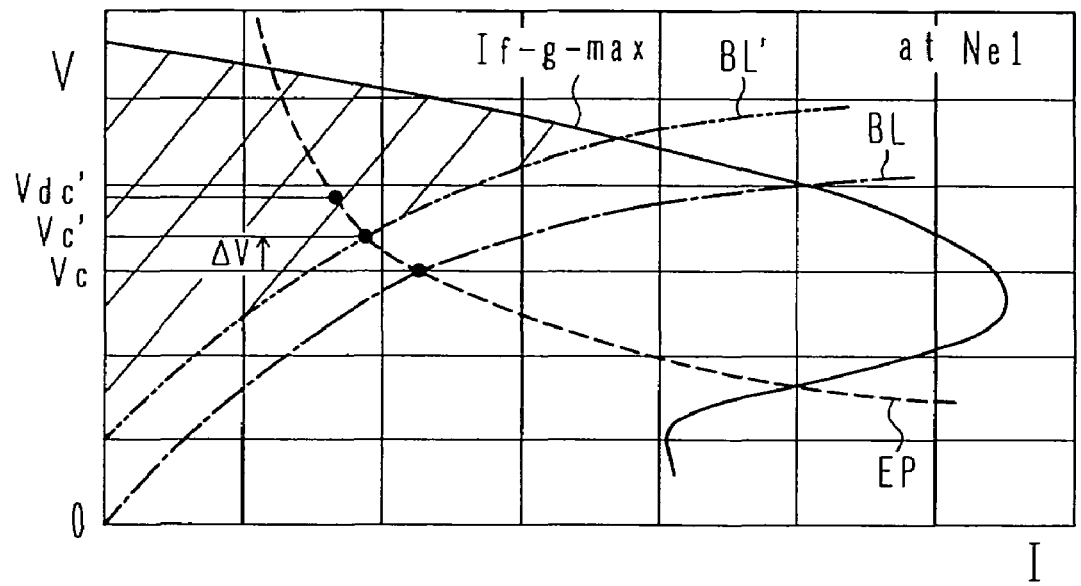
FIG. 9 illustrates an operation that is performed by the voltage/current command generator in the controller according to the first embodiment of the present invention.

The data possessed by the voltage command correction unit F10B1 will now be described with reference to FIG. 9. As is the case with FIG. 6, FIG. 9 illustrates the alternator's power generation characteristic. The vertical axis indicates the alternator's output voltage V, and the horizontal axis indicates the alternator's output current I.

The figure shows a boundary line BL, which is a boundary line between the unstable region and stable region while the engine speed is Ne1. The low-voltage side of the boundary line BL is the unstable region. The high-voltage side of the boundary line BL is the stable region. The present embodiment divides the stable region into an absolute stable region and an intermediate stable region. The boundary line between these two regions is a second boundary line BL'. The intermediate stable region is adjacent to the first boundary line BL, that is, adjacent to the unstable region. The intermediate stable region is a region where instability may result due to disturbance caused, for instance, by changes in the engine rotation or by load variations invoked by the motor/inverter. On the other hand, the absolute stable region is a region where instability may never occur even when disturbance arises. When the voltage at the intersection between the equal power curve EP and the first boundary line BL is Vc, the second boundary line BL' includes the voltage Vc'=Vc+ΔV on the equal power curve EP. The value ΔV is determined as needed in accordance, for instance, with the alternator characteristics, engine characteristics, or motor/inverter characteristics. The predetermined voltage value ΔV is a voltage allowance value that is determined in consideration of the power generation control characteristic and disturbance (which is caused by changes in the engine rotation or by load variations invoked by the motor/inverter) and does not incur instability even when the disturbance occurs. When, for instance, the alternator's maximum output is 3 kW, the maximum output voltage is 60 V, and the maximum output current is 50 A, the value ΔV is set at 5 V or so. It goes without saying that the value ΔV can be set at 2 V depending, for instance, on the alternator characteristics, engine characteristics, or motor/inverter characteristics. In some cases, it may be necessary that the value ΔV be set at 9 V.

The alternator output is maximized when the maximum field current If-g-max, which is within the maximum output range, is applied. Therefore, the stable control region is a region that is positioned on the low-voltage side of the alternator output range prevailing when the maximum field current If-g-max is applied, and is positioned on the high-voltage side of the second boundary line BL' and hatched as indicated in the figure.

The power on which the equal power curve EP is based is calculated from a torque command value Tr*, motor rotation speed ωm, and motor efficiency η (is equal to Tr*×ω×η). Although the motor efficiency η slightly varies with the motor rotation speed, it may be virtually fixed.

If, for instance, the alternator's voltage base command value, which is output from the alternator voltage base map F10A1, is Vdc' as indicated in the figure, it is within the stable control region that is hatched. Therefore, the voltage command correction unit F10B1 outputs the alternator's final voltage command value Vdc*=Vdc' without correcting the alternator's voltage base command value Vdc'.

Figure 10:
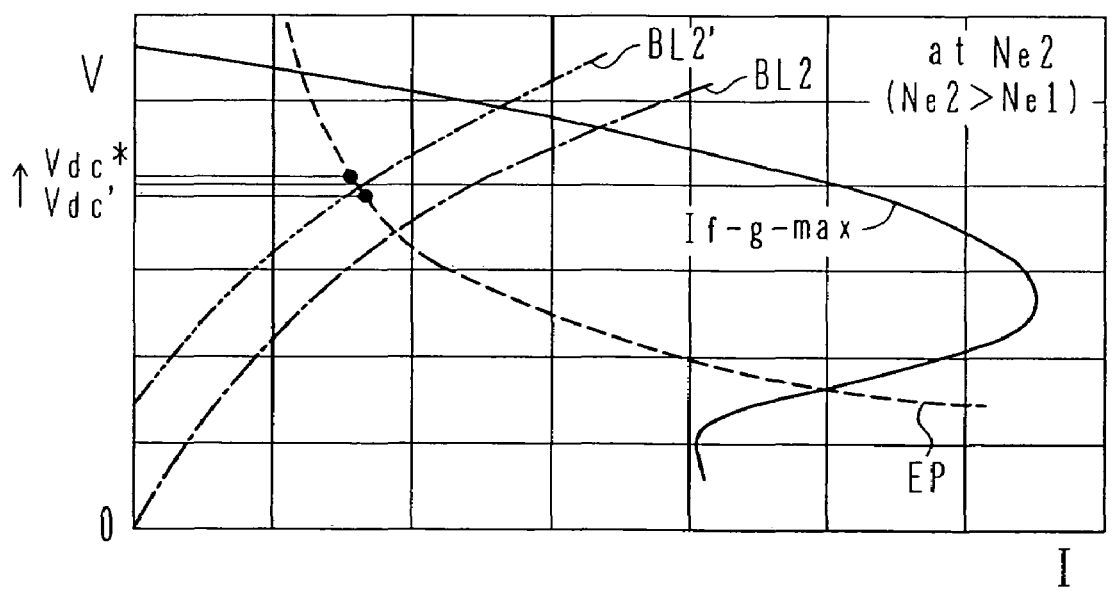
FIG. 10 illustrates an operation that is performed by the voltage/current command generator in the controller according to the first embodiment of the present invention.

A case where the engine speed is increased from Ne1 to Ne2 (Ne2>Ne1) will now be described. FIG. 10 shows data that the voltage command correction unit F10B1 retains for engine speed Ne2. When compared with FIG. 9, FIG. 10 indicates that the boundary line BL2 is moved toward the high-voltage side. As a result, a second boundary line BL2' is also moved toward the high-voltage side. If, in this instance, the alternator's voltage base command value that is output from the alternator voltage base map F10A1 is Vdc' as is the case with FIG. 9, the alternator's voltage base command value Vdc' is within the intermediate stable region, which is positioned between the second boundary line BL2' and boundary line BL. If this condition is allowed to continue, the alternator's voltage base command value Vdc' may fall within the unstable region. Therefore, the voltage command correction unit F10B1 moves along the equal power curve EP with respect to the alternator's voltage base command value Vdc' and outputs the voltage Vdc* within the stable control region as the alternator's final voltage command value Vdc*. The final voltage command value Vdc* may be positioned anywhere within the stable control region. In the currently used example, however, the final voltage command value Vdc* represents a voltage that is slightly higher than at the second boundary line BL2'.

When the engine speed increases, the boundary line BL moves toward the high-voltage side. Consequently, the generator's operating point, that is, the alternator's voltage base command value Vdc', approaches the unstable region. In this instance, the voltage command correction unit F10B1 changes the operating point so that the alternator's voltage base command value Vdc' is within the stable control region. More specifically, when the alternator's operating point is within the intermediate stable region where the voltage is higher than and the current is smaller than at the boundary line, the voltage command correction unit F10B1 changes the operating point so that the alternator's operating point is within the stable control region.

Figure 11:
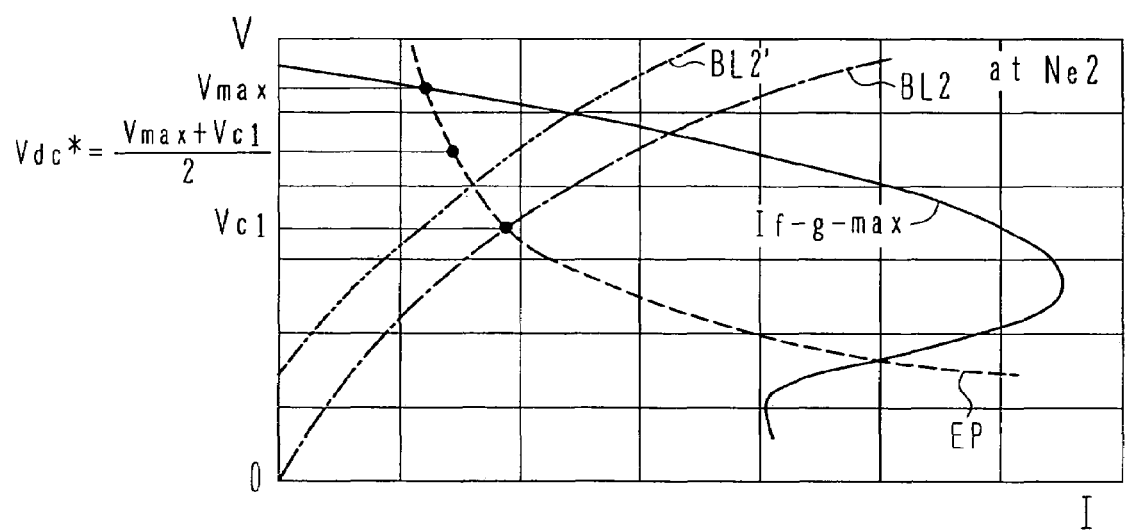
FIG. 11 illustrates an operation that is performed by the voltage/current command generator in the controller according to the first embodiment of the present invention.

In the example shown in FIG. 10, the final voltage command value Vdc* is within the stable control region and represents a voltage that is slightly higher than at the second boundary line BL2'. However, the example shown in FIG. 11 is also acceptable. More specifically, when, as indicated in FIG. 11, the voltage at the intersection between the equal power curve EP and boundary line BL2 is Vc1 at an engine speed of Ne2 and the voltage at the intersection between the equal power curve EP and maximum output voltage If-g-max is Vmax, the voltage command correction unit F10B1 outputs an intermediate value between a control stability limit voltage line and maximum output voltage, that is, ((Vmax+Vc1)/2), as the final voltage command value Vdc*. When the intermediate value between the control stability limit voltage line and maximum output voltage is used as described above, the most consistent voltage value that avoids output voltage saturation and control instability can be used as the command value.

The operation of the current command adjustment unit F10B2 will now be described with reference to FIGS. 12 and 13.

The current command adjustment unit F10B2 changes the d-axis current base command value Id' and q-axis current base command value Iq', which are output from the base command determination unit F10A, and outputs a final d-axis current command value Id* and final q-axis current command value Iq*.

The voltage command correction unit F10B1 can change the alternator's output voltage to prevent the control system from becoming unstable. However, if the motor current command is not changed in a situation where the alternator output voltage is raised, a weak field current works to suppress the voltage so that the base voltage reverts to the one prevailing before a change although the voltage received by the inverter is raised. The weak field current does not virtually affect the torque and becomes a loss (reactive current component). Therefore, when the current command is not changed, the motor drive efficiency remains unchanged although the voltage is raised. Thus, the motor's optimum operating point may not prevail. When the alternator's output voltage (the voltage received by the inverter) is raised to avoid inconsistent alternator control in a situation where the engine speed is increased, the weak field current is reduced by a voltage increase amount to decrease the motor's reactive current component, thereby operating the motor at the optimum operating point. The current command is handled as described above, it is possible to provide increased motor drive efficiency. More specifically, the motor drive efficiency can be increased when the voltage command correction unit F10B1 operates the alternator 4 at the optimum operating point to avoid an unstable alternator operation and the current command correction unit F10B2 operates the motor 6 at the optimum operating point.

An example of a method for reducing the weak field current will now be described. FIG. 12 is a motor voltage vector diagram illustrating a situation where a motor current is supplied in compliance with a base command. FIG. 12 shows a rotating coordinate system that is referenced to the flux axis of the motor rotor. The d-axis represents the flux direction of the rotor, whereas the q-axis represents the direction orthogonal to the flux direction of the rotor. The q-axis is basically orthogonal to the flux axis. Therefore, applying a current in the direction of the flux axis generates torque. If a current is applied in the direction of the d-axis, that is, in the flux direction, it is possible to adjust the amount of flux that is generated by the motor. Weak field control corresponds to a process of applying the d-axis current in order to adjust the amount of flux.

Figure 12:
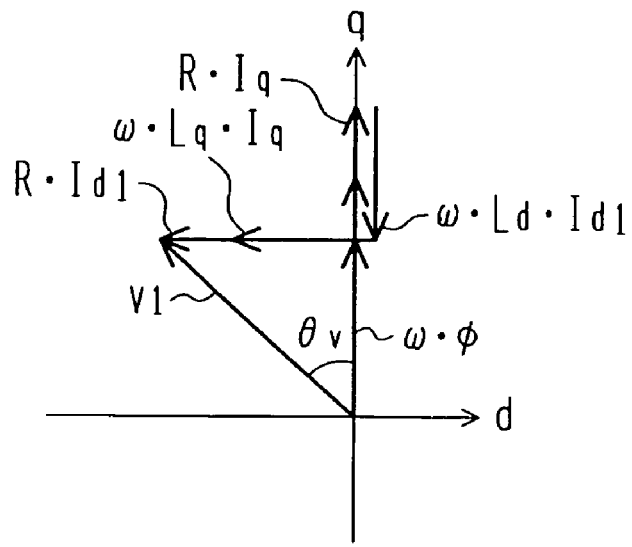
FIG. 12 illustrates an operation that is performed by the voltage/current command generator in the controller according to the first embodiment of the present invention.

An induced voltage ω·φ is generated in the direction of the q-axis in FIG. 12. The induced voltage can be reduced by voltage (ω×Ld×Id) when the d-axis current Id flows in the negative direction. ω is a motor angular speed, φ is a field main magnetic flux, and Ld is d-axis inductance. FIG. 12 shows a case where a weak field current Id1 flows.

When weak field control is exercised as described above, the motor can be driven in a high rotation speed region where the motor's induced voltage is higher than the voltage received by the inverter.

On the other hand, when the alternator's output voltage is raised to avoid an unstable control region as described earlier in a situation where the engine speed is increased, the weak field current can be reduced because the voltage received by the inverter can be raised. This makes it possible to provide increased motor drive efficiency. FIG. 13 is a diagram illustrating a motor voltage vector that prevails in the above situation.

Figure 13:
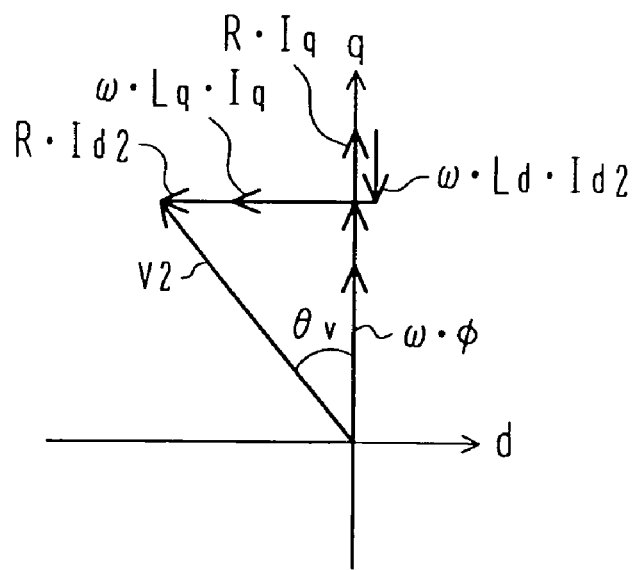
FIG. 13 illustrates an operation that is performed by the voltage/current command generator in the controller according to the first embodiment of the present invention.

In FIG. 13, the weak field current is reduced so that the d-axis current of the weak field current Id2 flows. The induced voltage, which is reduced by the above operation, is then equal to ω×Ld×Id2. Thus, the magnitude of the actual voltage vector is V2, which is greater than the magnitude of the voltage vector V1 shown in FIG. 12. As a result, the motor can be driven at a voltage higher than the base voltage. This also provides increased motor drive efficiency.

An example of a method for determining a d-axis current command Id* in a situation where the alternator's output voltage is raised will now be described. When the voltage prevailing after the alternator's output voltage is raised is Vdc*, the magnitude V of a voltage vector that can be output from the inverter is expressed by Equation (1) below:

$$V = Vdc^* \times \sqrt{3}/(2 \times \sqrt{2}) \quad (1)$$

In Equation (1), the coefficient for Vdc* varies depending on inverter modulation and the employed coordinate transformation method, and is not limited to the above value.

In a relatively high rotation speed region where weak field control is exercised, the resistance component R of motor impedance is one order of magnitude smaller than the reactance component ω×L. Therefore, if the resistance component R is ignored in the above-mentioned region, the d-axis voltage Vd and q-axis voltage Vq are as indicated below:

$$Vd = -\omega \times Lq \times Iq \quad (2)$$

$$Vq = \omega\varnothing + \omega \times Ld \times Id \quad (3)$$

Thus, Equation (4) below holds true:

$$V = \sqrt{(Vd^2 + Vd^2)} \quad (4)$$

When Equations (1) to (4) above are solved, the d-axis current Id to be applied for the present Vdc* can be calculated.

It is assumed that the q-axis current Iq is base command data. If, in this instance, the d-axis current is changed while a salient pole or reverse salient pole motor is used, it is conceivable that changes in a reluctance torque component may affect the operating point for a base command and deteriorate torque accuracy. If torque changes are not within a permissible range, the q-axis current is increased or decreased to compensate for a reluctance torque increase/decrease that is caused by a change in the d-axis current.

An example of a method for reducing the weak field current when the alternator's output voltage is raised has been described above. However, it should be noted that the method for reducing the weak field current is not limited to the one described above. An alternative would be to solve a motor torque equation to calculate a current command that provides the voltage to received by the inverter and the torque required of the motor. Another alternative would be to subtract a predetermined value from a base current command in consideration of the computational load on the controller.

The present invention has been described on the assumption that the present invention is applied to a vehicle without a driving battery. However, the present invention may also be applied to an electric vehicle having a driving battery. Even when the vehicle has a battery, the control described in conjunction with the present embodiment may be effective if the output energy of the generator needs to be equal to the input energy of the inverter depending on the state of the battery.

What is claimed is:

1. A controller for an electric vehicle in which first wheels and second wheels are driven respectively by an internal combustion engine and by an AC motor, and DC power output from a generator that is driven by the internal combustion engine is converted to AC power by an inverter and supplied to the AC motor to drive the AC motor, the controller comprising:

control means for controlling not only a field current of the generator to control power that is output from the generator, but also torque that is output from the AC motor, wherein, when an operating point of the generator approaches an unstable region where the generator unsteadily operates, said control means changes the operating point of the generator so that the operating point is within a stable region.

2. The controller according to claim 1, wherein the stable region comprises an intermediate stable region, where the output voltage of the generator is higher and the output current of the generator is smaller than at a boundary line between the unstable region and the stable region, and an absolute stable region, where the output voltage of the generator is higher and the output current of the generator is smaller than in the intermediate stable region; and wherein, when the operating point of the generator is within the intermediate stable region, said control means changes the operating point so that the operating point is within the absolute stable region.

3. The controller according to claim 1, wherein said control means changes the operating point of the generator to prevent the output voltage of the generator from decreasing when the inverter is controlled.

4. The controller according to claim 3, wherein said control means changes the operating point of the generator in accordance with the rotation speed of the internal combustion engine to prevent the output voltage of the generator from decreasing when the inverter is controlled.

5. The controller according to claim 1, wherein said control means includes a voltage command correction unit for changing the output voltage of the generator in accordance with the rotation speed of the internal combustion engine.

6. The controller according to claim 5, wherein said voltage command correction unit includes a boundary line indicating a control stability limit of each rotation of the generator, and uses a voltage that is higher than the boundary line by a predetermined value, as an output voltage command value for the generator.

7. The controller according to claim 5, wherein said voltage command correction unit includes a boundary line indicating a control stability limit of each rotation of the generator and a maximum output voltage line, and uses an intermediate value between the boundary line and the maximum output voltage line as an output voltage command value for the generator.

8. The controller according to claim 5, wherein said control means further includes a current command adjustment unit for changing a command value for a motor current to the AC motor in accordance with the rotation speed of the internal combustion engine and an output voltage command for the generator, which is corrected by said voltage command correction unit.

9. The controller according to claim 8, wherein the command value for the motor current to the AC motor is a command value for a d-axis current, which is oriented in a rotor flux direction of the AC motor.

10. The controller according to claim 8, wherein said current command adjustment unit calculates a difference between the output voltage command for the generator, which is set in accordance with the rotation speed of the internal combustion engine, and a predetermined reference voltage command, and changes a motor current command value by a weak field current corresponding to the voltage command difference.

11. The controller according to claim 1, wherein, when the rotation speed of the internal combustion engine increases while the output power of the AC motor remains unchanged, said control means changes the operating point of the generator so that the output voltage of the generator increases.

12. A controller for an electric vehicle in which first wheels and second wheels are driven respectively by an internal combustion engine and by an AC motor, and DC power output from a generator that is driven by the internal combustion engine is converted to AC power by an inverter and supplied to the AC motor to drive the AC motor, the controller comprising:

control means for controlling not only a field current of the generator to control power that is output from the generator, but also torque that is output from the AC motor, wherein, when the rotation speed of the internal combustion engine increases while the output power of the AC motor remains unchanged, said control means changes the operating point of the generator so that the output voltage of the generator increases.

13. A driving apparatus for use in an electric vehicle in which first wheels and second wheels are driven respectively by an internal combustion engine and by an AC motor, the driving apparatus comprising:

a generator for being driven by the internal combustion engine;

an inverter for receiving DC power output from the generator and converts the DC power to AC power;

the AC motor that is driven upon receipt of the AC power supplied from said inverter; and control means for controlling not only a field current of the generator to control power that is output from the generator, but also torque that is output from the AC motor;

wherein, when an operating point of the generator approaches an unstable region where the generator unsteadily operates, said control means changes the operating point of the generator so that the operating point is within a stable region.

14. A driving apparatus for use in an electric vehicle in which first wheels and second wheels are driven respectively by an internal combustion engine and by an AC motor, the driving apparatus comprising:

a generator for being driven by the internal combustion engine;

an inverter for receiving DC power output from the generator and converts the DC power to AC power;

the AC motor that is driven upon receipt of the AC power supplied from said inverter; and control means for controlling not only a field current of the generator to control power that is output from the generator, but also torque that is output from the AC motor;

wherein, when the rotation speed of the internal combustion engine increases while the output power of the AC motor remains unchanged, said control means changes an operating point of the generator so that the output voltage of the generator increases.

* * * * *